United States Patent [19]

Burch et al.

[11] 4,184,142
[45] Jan. 15, 1980

[54] PULSE GENERATING CIRCUIT MEANS FOR DEPTH SOUNDER ALARM AND TRANSMITTER

[75] Inventors: John Burch; Paul W. Wells, both of Seattle, Wash.

[73] Assignee: A-B Electronic Systems Company, Kent, Wash.

[21] Appl. No.: 865,539

[22] Filed: Dec. 29, 1977

[51] Int. Cl.² ............................ G01S 9/68; G01S 7/56
[52] U.S. Cl. ........................................................ 367/112
[58] Field of Search ................................ 340/1 C, 3 C

[56] References Cited

U.S. PATENT DOCUMENTS

| | | | |
|---|---|---|---|
| 3,528,053 | 9/1970 | Rubin | 340/1 C |
| 3,624,596 | 11/1971 | Dickenson et al. | 340/3 C |
| 3,733,582 | 5/1973 | Eck et al. | 340/1 C |

FOREIGN PATENT DOCUMENTS 470826  5/1974  Australia .................. 340/3 C

*Primary Examiner*—Richard A. Farley
*Attorney, Agent, or Firm*—Seed, Berry, Vernon & Baynham

[57] ABSTRACT

Circuit means for keying the transmitter of a flasher type depth sounder when the flasher arm motor is off. An alarm circuit is included in the depth sounder which sounds an alarm if the vessel moves away from a preset depth. When the flasher arm motor is on, a pulse is supplied by a magnet on the flasher arm passing over a pickup coil in the circuit. When the flasher arm motor is off, the pulse generating circuit is designed to provide a transmitter keying signal as well as to reset the alarm.

4 Claims, 4 Drawing Figures

PULSE GENERATING CIRCUIT MEANS FOR DEPTH SOUNDER ALARM AND TRANSMITTER

BACKGROUND OF THE INVENTION

The invention relates to the alarm system of a depth sounder and more particularly to a circuit for triggering the transmitter and the depth alarm circuit when the flasher arm motor is turned off.

In the heretofore known prior art depth sounders, alarms have been made to warn the user when the water depth is too shallow but this was only possible with the flasher arm rotating. It can also be of great use to boat operators to have some form of alarm to indicate when the boat deviates from some preset depth or depths while at anchor at which time the full capabilities of the depth sounder are not required and when a mode of operation requiring considerably less battery current is advantageous.

With respect to flasher type depth sounders, it is known that they are popular because they display much information in an easily readable form. However, they require a substantial amount of current for the flasher arm motor. This is particular disadvantageous on small sailboats where no means of charging the battery is available, or when a boat is at anchor and the engine and thus the alternator or generator is off. Heretofore, it has not been possible to switch off the flasher arm motor because the magnet was attached to the rotating flasher arm which magnet was used to key the transmitter. Hence, the need for a depth alarm function which can be operative even with the motor off has been a recognized need for boaters.

Prior art references considered with respect to this invention are U.S. Pat. Nos. 3,223,965; 3,733,582; 3,740,705 and 3,747,413.

SUMMARY OF THE INVENTION

Circuit for triggering the transmitter circuit of a flasher type depth sounder when the flasher arm motor is turned off. The triggering circuit includes a switching means for energizing the flasher arm motor in normal operation and an economy mode switch for triggering the transmitter when the flasher arm motor is off. In the economy mode a pulse is generated by a timing circuit which causes the transmitter to trigger and the depth alarm to reset. The power consumption is reduced from approximately 300 ma to about 80 ma both because the motor is off and because the repetition rate of the transmitter signal is lessened. Hence, power drain on the vessel's battery is reduced.

DESCRIPTION OF PREFERRED EMBODIMENT

Figure 2:
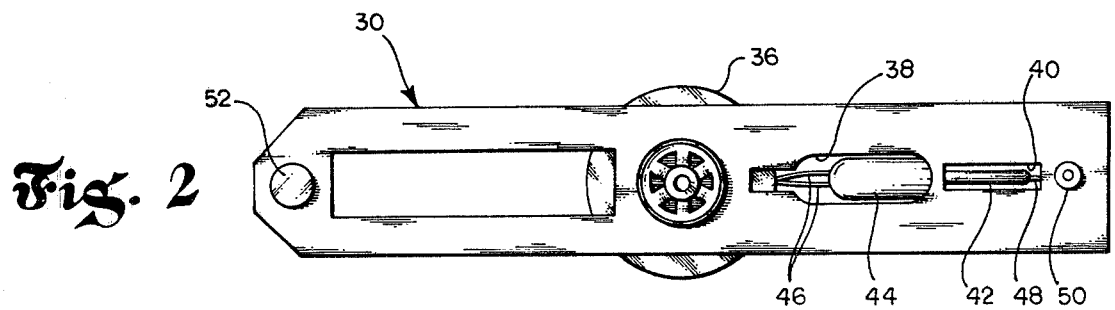
FIG. 2 is a plan view of the details of the flasher arm in a flasher type depth sounder.
Figure 3:
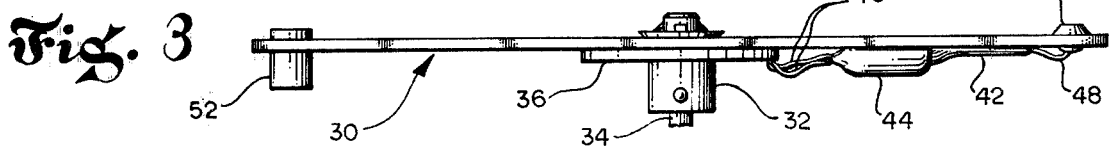
FIG. 3 is a side elevation view of the flasher arm of FIG. 2 and further illustrating details of its construction.
Figure 4:
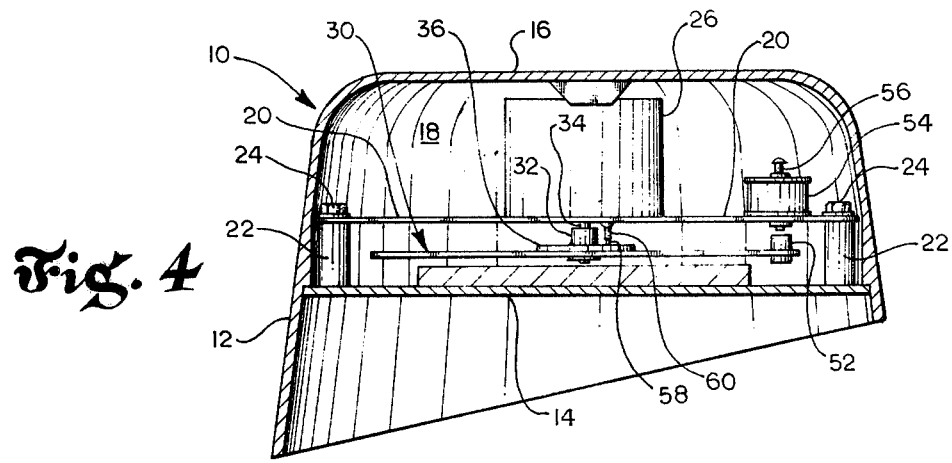
FIG. 4 is a cross-sectional view through a depth sounder showing the position of the flasher arm and within which is included the circuit of FIG. 1.

Referring now to the drawings and in particular FIGS. 2–4, it will be seen that there is provided a depth sounder, generally designated by the number 10, having molded plastic housing 12, and a front face panel 14 which is mounted forwardly of and in space relation to the rear wall 16 to define housing interior 18. A mounting base 20 is secured to spacers 22 as by screws or bolts 24 so that the mounting base 20 is in spaced relation to the backside of the face panel 14.

The depth sounder flasher arm, generally designated by the number 30 is an elongated flat, generally rectangular arm mounted on hub 32 which in turn is driven by motor shaft 34. A metallic slip ring 36 is mounted on the hub side of the flasher arm. At one end of the arm can be seen openings 38 and 40. A flasher bulb 42 is mounted on the hub side of the arm such that the narrow flashing bulb section 42 is facing through opening or slot 40. Leads 46 extend from the base 44 of the flasher bulb to the slip ring 36. Leads 48 at the outer end of the flasher bulb are connected to eyelet 50 to form a ground path for the bulb circuit. A magnet 52 is mounted in the opposite end of the arm in the manner shown in the drawings. A pickup coil 54 is mounted by screw 56 on the base member 20 in such a way that as the flasher arm rotates about the face of the magnet and the end of screw 56 provide a clearance of about 0.020 to 0.030 inches. Additionally a brush 58 with its holder 60 are mounted on the base member such that the brush 58 contacts the slip ring 36, thus completing a circuit path for flasher bulb 42.

Figure 1:
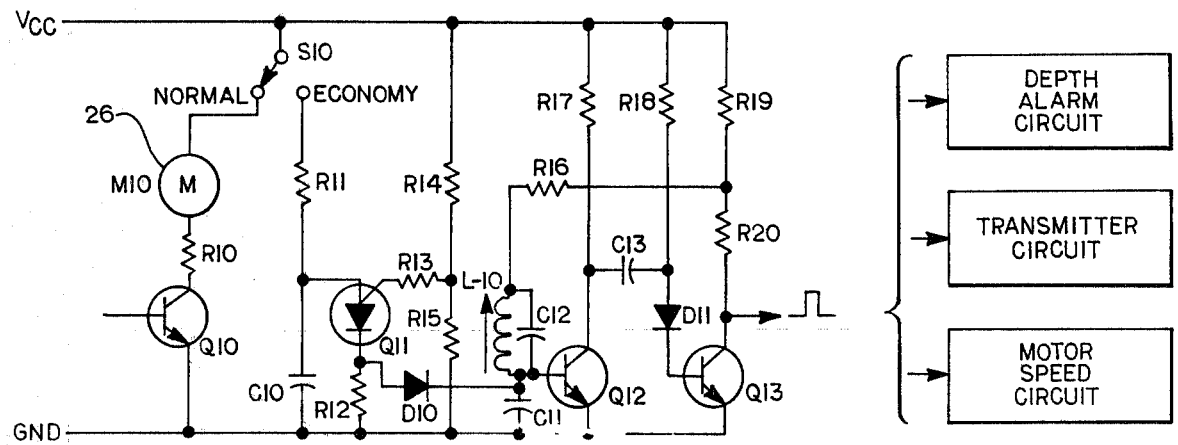
FIG. 1 is a schematic diagram of the circuit of this invention.

Referring now to the schematic of FIG. 1, it will be understood that when the switch S10 is in the "normal" mode, power is applied to the motor for turning the same. Magnet 52 on one extremity of the flasher arm 30 passes over pick-up coil L10 once every revolution. The resultant pulse triggers the one-shot formed by transistors Q12 and Q13. The pulse at the collector of Q13 is used to trigger the transmitter and to reset the alarm circuit.

With S10 in the "economy" mode, power is removed from the motor and applied to the charging or timing resistor R11. Transistor Q11 is a programmable unijunction transistor which operates as a relaxation oscillator the frequency of which is defined by resistor R11 and timing capacitor C10. Resistances R13, R14, and R15 provide a reference voltage for the unijunction transistor Q11. Pulses are generated at the cathode of Q11 across resistor R12 and applied to the base of transistor Q12 via diode D10. It will be appreciated that with the circuit in its "normal" mode it is not desired to load the Q12/Q13 one-shot so diode D10 insures that resistance R12 does not load Q12. At any rate, the pulses generated at the cathode of Q11 and applied to the base of Q12 via D10 cause the one-shot comprised of Q12 and Q13 to fire thus, in turn, causing the transmitter to trigger and the depth alarm to be reset.

In the circuit R10 is a current limiter and transistor Q10 is the motor drive transistor. Resistance R16 provides feedback for the Q12/Q13 one-shot multi-vibrator which functions as a pulse shaping circuit for triggering the transmitter. Transistor Q13 in the quiescent period is held on by base current through R18 and diode D11. The voltage at the junction of resistance R19 and resistance R20 is low enough so that Q12 is held off. A positive pulse at the base of Q12 can be provided by coil L10 or by transistor Q11 via diode D10 to turn Q12 on. The collector voltage at Q12 will fall and be coupled by capacitor C13 to the junction of resistance R18 and diode D11 driving this junction minus. Transistor Q13 is thus cut off, its collector voltage rises and provides a pulse or positive feedback through resistance R16 and coil L10 to the base of Q12. This condition will prevail until resistance R18 charges capacitor C13 to a predetermined voltage level (approximately 1.4v) which is high enough to turn Q13 on again and therefore turn Q12 off. Capacitor C11 is included as another noise filter to prevent false triggering.

It will be appreciated that with a sixty feet scale, a pulse is delivered approximately every 25 milliseconds. In the economy mode, the keying or triggering circuit pulses the transmitter about every 500 milliseconds which is sufficient to sample depth. Energy drain on the battery is thus reduced by removing the motor and lowering the sampling or duty cycle of the transmitter.

What is claimed is:

1. In a flasher type depth sounder device having an echo ranging transmitter and an alarm circuit means, and also including a motor-driven rotary flasher arm, the improvements of a pulse generating and triggering circuit for said transmitter and alarm circuit means, comprising:
   (a) switch means for energizing said flasher arm motor in a high power mode and for energizing said triggering circuit in a low power mode when said motor is de-energized,
   (b) first subcircuit timing circuit means for producing signals at predetermined time intervals, and
   (c) second subcircuit means for receiving said signals from said timing circuit and for generating an output signal for triggering the transmitter and for resetting the alarm circuit of the depth sounder.

2. The pulse generating and triggering circuit for a depth sounder device according to claim 1, and in which the flasher arm of said depth sounder includes a magnet at one extremity thereof and in which said first subcircuit includes a pick-up coil means for generating a timed signal for input to said second subcircuit means.

3. The pulse generating and triggering circuit for a depth sounder device according to claim 1 and in which said first subcircuit means includes a programmable unijunction transistor together with first timing resistance and first timing capacitor means for generating a timed pulse output when said flasher are motor is off.

4. The pulse generating and triggering circuit for a depth sounder device according to claim 3 and in which said second subcircuit means includes a one-shot multivibrator which functions substantially as a wave shaping means for generating an output signal to the depth sounder transmitter and alarm circuits.

* * * * *